Jan. 12, 1960 C. S. WHITE Re. 24,765

LOW FRICTION FABRIC MATERIAL

Original Filed Nov. 4, 1955 2 Sheets-Sheet 1

INVENTOR.
Charles S. White.
BY
Karnes, Dickey & Pierce.
ATTORNEYS.

LOW FRICTION FABRIC MATERIAL

Original Filed Nov. 4, 1955 2 Sheets-Sheet 2

INVENTOR.
Charles S. White.
BY
Harness, Dickey & Pierce
ATTORNEYS.

United States Patent Office

Re. 24,765
Reissued Jan. 12, 1960

24,765

LOW FRICTION FABRIC MATERIAL

Charles S. White, Palmdale, Calif.

Original No. 2,804,886, dated September 3, 1957, Serial No. 544,945, November 4, 1955. Application for reissue January 19, 1959, Serial No. 787,787

7 Claims. (Cl. 139—420)

Matter enclosed in heavy brackets [ ] appears in the original patent but forms no part of this reissue specification; matter printed in italics indicates the additions made by reissue.

This invention relates to low friction materials, and more particularly relates to a method for making and the fabrics which result from the use of such method and materials.

Low friction plastic materials have had very limited use as bearings, seals, pistons and the like, for different reasons, some of which are failures at low temperatures, cold flow, change in physical characteristics under heating and pressure, and lack of bonding characteristics.

The present invention primarily employs plastic materials which themselves have low friction characteristics, and is based on the discovery that unexpectedly useful low friction surfaces are produced if plastic materials having relatively low friction characteristics are employed in the form of fibers. A supporting surface is provided which retains the fibers in position to resist cold flow during the period of relative motion between the surface carrying the low friction material and the opposed surface when the surfaces are loaded. Various attempts have been made to support the low friction materials so as to resist cold flow during use and due to the simplicity of handling and ease in manufacturing, the present invention contemplates the employment of the fibers in a woven form. By this means the fibers are disposed and supported so as to be substantially uniformly distributed in or on a supporting surface woven into the fabric.

The compound fabric material having the low friction fibers is bonded to a body made from suitable materials to form bearings, seals, pistons and the like. The body material which supports the uniformly distributed fibers may vary substantially, that is to say, such material may be thermosetting and thermoplastic resins, such as phenol-aldehyde resins including particularly phenol formaldehyde resins, urea-formaldehyde resins, polyester resins, elastomeric materials including natural and synthetic rubbers and the urethanes. For application such as bearings or seals it will be apparent that the body material which is selected for any particular application must be one which has the ability to resist deformation and to retain its shape and properties under the temperature conditions resulting from use. It is therefore advisable to select a high temperature resistant material, preferably of the thermosetting type, such as phenol formaldehyde resins. It is to be understood that conventional fillers and tensile reinforcing fibers for such resinous materials may be incorporated if desired and are advisable where the resulting structure is to be subjected to relatively high unit pressures during use. For the worst conditions normally encountered in bearing and sealing applications, glass fiber filled resins are especially satisfactory.

Fibers having low friction characteristics which have been found to be satisfactory for the purposes of this invention include the polyamide resins marketed under the name of nylon, [the polyester resins marketed under the name Dacron,] polyethylene, the polymeric fluorocarbon resins including tetrafluoroethylene, marketed under the trade name Teflon, and the monochloro-trifluoroethylene resins marketed under the trade names of Kel-F and Fluorothene, available from M. W. Kellogg Co. and Union Carbide and Carbon Corp., respectively. [For certain applications, vinyl chloride resin fibers, commercially available under the name Saran and marketed by Dow Chemical Company, are also useful.] The tetrafluoroethylene resins are unusually superior to the other resin fibers for the purposes of this invention as they will withstand approximately 500° temperature, although it is to be understood that other fibers are satisfactory for lower temperature application and will even be preferred for certain applications because of lower cost and greater ease in manufacture, such as nylon and polyethylene fibers. The fibrous materials of this invention and the low friction surfaces prepared therefrom uniquely differ from solid bodies or sheets of the same material because in certain applications, where sheet materials have completely failed, fibers of that same material uniformly disposed and positively retained against flow on a similar surface have proved to be satisfactory. The low friction fiber material in most cases does not bond readily with other materials, and in order to assure a good bond, bondable fibers are woven on the reverse side of the woven low friction fibers so that on the working face of the resulting woven material a low friction surface will be provided and on the opposite face a bondable surface will be present. Thus assurance is had that the low friction fibers will be retained in position at all times since the bondable fibers are positively retained in position on the supporting material. For example, inherent resistance to bonding is possessed by the polymeric fluorocarbon resins and these fibers have been successfully woven on a conventional backing material such as cotton, rayon, nylon, wool, glass and the like, in such a manner that the working face carries uniformly distributed fluorocarbon resin fibers on its surface. In any arrangement fibers are employed on the working face having low friction characteristics, while dissimilar fibers or cords on the opposite face have bondable characteristics. This procedure facilitates the attachment of such fibers to the supporting body material directly by such fiber material or by the use of adhesion or bonding materials which will secure the cotton, rayon, wool, etc., thereto. Thus, the low friction face may be applied to a fabric having a bondable back face, to the face of a webbing material if body is desired back of the low friction face, or to the inner or outer sides of a fabric in sleeve form, with the opposite side having the bondable face.

In bearing and sealing applications, failure occurs when the low friction surface materials cold flow, spall or seize during use and although it has not been completely experimentally established, it is thought that the fibers are successful for the purpose of this invention relative to sheet materials because the fibers are much stronger in tensile strength than sheet material fabricated from exactly the same substance. For example, in the case of tetrafluoroethylene resins, the tensile strength is approximately twenty-five times greater than the tensile strength of the material in sheet form. The exceedingly high tensile strength of the tetrafluoroethylene resin in fiber or filament form provides substantial resistance against cold flow which occurs when the resin is in sheet or block form. Adding to this substantial resistance against cold flow by the fibers and the secure anchor provided by the bondable cords woven to one face of the fibers, assurance is had that a permanent low friction surface is provided which resists wear, flow and deterioration.

The low friction materials of this invention have different characteristics and properties but may be broadly defined as materials having a coefficient of friction against polished steel of approximately 0.02 to 0.15, these coefficients being obtained in the absence of conventional lubrications and in dry form. The polymeric fluorocarbon resins are stable and useful at temperatures through 500° F. and even as high as 600° in certain cases, and it can well be appreciated that such fibers backed with glass fibers will withstand high temperatures without deforming while retaining the low friction characteristics.

In the copending application of Charles S. White, Serial No. 396,893, filed September 8, 1953, *now Patent No. 2,835,521*, for Ball Joint Bearing Structures, a ball joint is illustrated having one element made from a plastic insert the shape of the ball which is set by the application of heat after the insert is shaped to the adjacent surface under pressure. When the compound fabric was secured to the insert with a surface of Teflon engaged with a mating polished surface, the joint was operated more than 600,000 times in the absence of a lubricant and under a load of 2200 pounds per square inch without any visible wear on the insert or surface. Under such a load the joint was expected to have a high breakaway characteristic, requiring a substantially greater force to initially move the joint than that required to move it thereafter. The breakaway load of the joint having the Teflon surface above described was surprisingly low, requiring no noticeable amount of applied force over that to move the joint after breakaway. For example, ball joints, such as those employed in an automobile having a load of 1200 pounds per square inch thereon have a static and dynamic force requirement to produce movement of 1½ ft. pounds in each instance. After 300,000 cycles of operation, the force requirement in both instances was 1 ft. pound and at 600,000 cycles the force requirement was 1⅝ ft. pounds in both instances. In this test, a small amount of grease was applied to the metal face of the socket at the time of assembly. No wear or damage to the surfaces was found when examining the joint parts after the 600,000 cycles of operation.

Accordingly, the main objects of the invention are: to provide a compound fabric having a low friction surface on one side and a bondable surface on the opposite side; to provide a strip of webbing with a face of low friction fibers which is woven directly thereto; to provide a sleeve of fabric material having on the inner or outer face a low friction fabric material and on the opposite face a bondable material; to provide a compound fabric with a face of low friction fiber woven together to form a compact continuous surface having on one side thereof exposed cords of bondable material; and, in general, to provide a fabric having a face of low friction characteristics which is simple in construction and economical of manufacture.

Other objects and features of novelty of the invention will be specifically pointed out or will become apparent when referring, for a better understanding of the invention, to the following description taken in conjunction with the accompanying drawings, wherein.

It is to be understood that various types of weaves may be employed for forming the compound fabric having on one side thereof the low friction fibers and on the opposite side thereof the bondable fibers. For example, when the compound fabric is employed for faces of seals, the bodies of which have elastomeric properties, the compound sleeve must be able to expand and contract with the elastomeric material and should offer no resistance to the application of pressure by the material of the seal. The weaves herein illustrated therefore are merely shown by way of example and not by limitation, as it is to be understood that in different applications different types of weaves will be employed.

Figure 1:
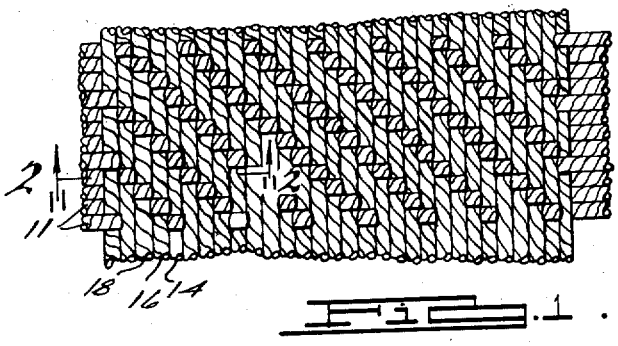
Figure 1 is a plan view of a fabric of the low friction type having bondable cords secured to one face thereof.
Figure 2:
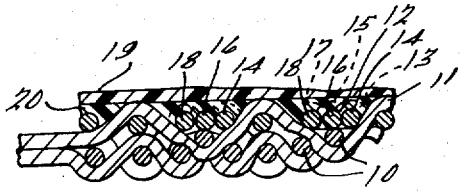
Fig. 2 is an enlarged sectional view of the structure illustrated in *Fig. 1 and also the backing member to which it is secured;*

For a flat fabric, reference may be had to Figs. 1 and 2 wherein one method of weave is illustrated for producing the compound fabric having the substantially solid surface of the low friction fibers and the bondable backing layer, substantially all of which is made up of bondable fibers. The low friction fibers 10 form the warp of the fabric, while the fibers 11 form the filler thereof. The layer of bondable cords 12 is disposed parallel to the warp cords 10 and is retained by having each of the filler cords 11 pick up a bondable cord 12 at certain spaced points, herein illustrated as every fourth cord. The next adjacent filler cord 13 picks up the next adjacent bondable cord 14 and skips three of the adjacent bonding cords before picking up the next adjacent cord 14. The third filler cord 15 will pick up the next bonding cord 16 and will skip three bonding cords and pick up the next adjacent bonding cord 16. The fourth filler cord 17 will pick up the next adjacent bonding cord 18 and will skip three of the bonding cords until it picks up the next adjacent bonding cord 18. Thus, it will be seen that the greatest percentage of the bonding cord will be exposed for bonding purposes and will leave the opposite face of the fabric substantially solid with the warp cords 10 and the filler cords 11 of low friction material. A compound fabric is thus provided having low friction fibers on one face and bondable fibers or cords on the opposite face. *The layer of bondable fibers or cords 12 may be readily bonded to a backing member 19 by a layer of suitable bonding material 20. As stated previously the bonding material 20 can be any suitable material which will bond cotton, rayon or wool of the layer of bondable fibers 12 to the backing member 19, and the backing member can be made from any suitable material such as, for example, one of the thermosetting or thermoplastic resins mentioned previously, to form bearings and the like.*

Figure 3:
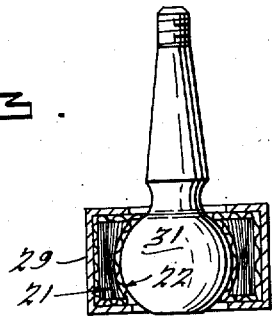
Fig. 3 is a sectional view of a ball forming a joint, with a woven low friction fabric face of a strip of webbing, embodying features of the invention.
Figure 4:
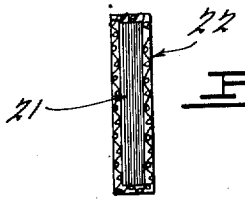
Fig. 4 is a sectional view of a strip of webbing employed in the socket of Fig. 3 before pressure is applied thereto.
Figure 5:
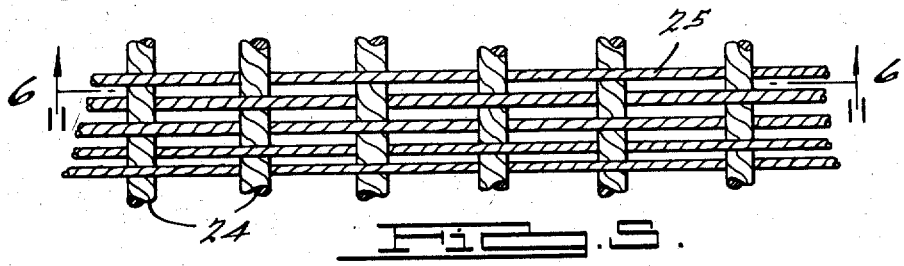
Fig. 5 is an enlarged plan view of the low friction webbing material illustrated in Fig. 4.
Figure 6:
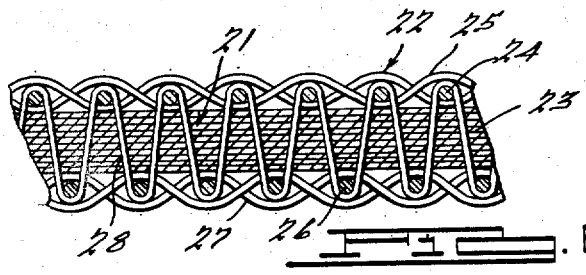
Fig. 6 is a sectional view of the woven webbing material illustrated in Fig. 5.

In Figs. 3 to 6, a webbing 21 is illustrated having on the face 22 thereof the low friction fibers. The face of the webbing is woven somewhat as a sleeve about a plurality of lengths of cords 23 which fill the interior of the sleeve and provide body to the resulting web. The one face 22 has warp cords 24 and filler cords 25 of the low friction fibers woven together at the same time that warp cords 26 of cotton or other material are woven with filler fibers 27 of cotton or other material on the other face. The front and rear woven portions of the webbing are tied together by the cords 28 which securely retain the free lengths of cords 23 in position therebetween. The low friction webbing may be employed, as illustrated in Fig. 3, within a channel-shaped socket 29 which retains the webbing under pressure, with the low friction face encompassing the ball portion 31 of the resulting ball joint. In such an arrangement, it may be desired to have the body cords 23 coated with a wax, grease, graphite and like materials so that the cords will readily shift when the flanges of the socket 29 are forced downwardly into parallel relation, as illustrated in the figure. This produces the desired amount of pressure between the face of low friction material of the webbing and the ball which permits the initial movement of the ball without requiring a substantial breakaway force, permitting a uniform movement under a uniform pressure. It is to be understood that when depth is desired to the low friction face, the opposite face of the webbing being of cotton or like material, may be bonded to other body materials to which the low friction material will not bond.

Figure 7:
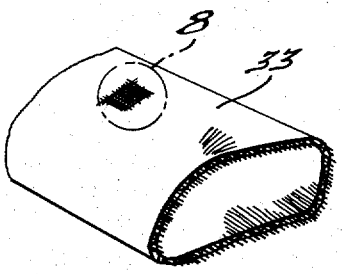
Fig. 7 is a perspective view of a sleeve woven to have a low friction surface on the inner face thereof, made in accordance with the present invention.
Figure 8:
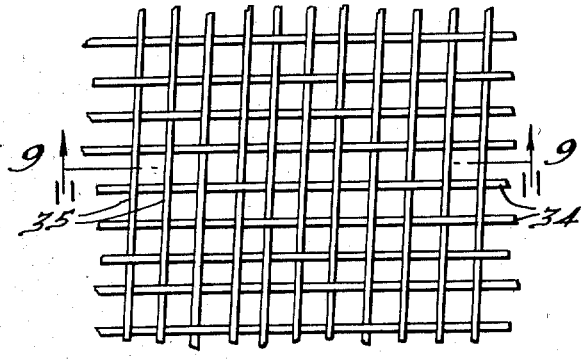
Fig. 8 is an enlarged view of the weave employed to construct the sleeve, as viewed within the circle 8 of Fig. 7.
Figure 9:
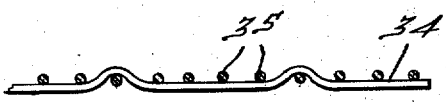
Fig. 9 is a sectional view of the structure illustrated in Fig. 8, taken on the line 9—9 thereof.

In Figs. 7, 8 and 9, a further form of the invention is illustrated, that wherein a sleeve 33 is woven from low friction fibers and a cord of bondable material. In this arrangement, the cord of bondable material 34 skips four cords of the low friction material 35 as it is continuously wound into cylindrical form. The cord 34 engages an adjacent cord 35 each revolution while skipping the cord 35 priorly engaged so that as the cord 34 is wound in cylindrical form at the end of five turns it will have engaged each of the five cords 35 of all of the groups of the low friction cords 34. It is contemplated that a sleeve of such material may be placed along the inner surface of bearing seals and the like, as illustrated in the copending application of Charles S. White, Serial No. 544,944, filed November 4, 1955, *now Patent No. 2,906,-552,* for Sealing and Bearing Device Having Low Friction Sealing Faces. When the material of the seal has substantial movement, the sleeve of low friction material must contract or expand therewith, in which case the elastic hosiery weave known in the art is preferably employed in constructing the sleeve. The sleeve of the low friction material woven with the elastic hosiery weave will not restrict the expansion and contraction of the body material of the seal. It was pointed out above that the various weaves were herein illustrated by way of example and not to be considered limiting since other types of known weaves may better be employed for certain applications of the resulting fabric, webbing and sleeve materials. It is to be understood that the woven material of low friction fibers may be applied to strips of packing material to form a face thereon which, when compressed about a stem or rod within a packing gland, will have low friction engagement therewith. Such a packing material could be provided by the webbing 21 if all of the outer surface contained the low friction fibers. It is also to be understood that the low friction fibers could be retained upon a layer of material to which it is secured by bonding, weaving or the like to prevent the cold flow of the fibers when subjected to pressure. The specific examples recited herein are not to be considered limiting as the low friction fibers may be secured to a layer of material by other means not specifically recited, and the weave employed in producing the fabric may take any form known in the art to be suitable. Such other examples as illustrated in Figs. 3 to 9 inclusive form the subject matter of a divisional application pending in the United States Patent Office.

What is claimed is:

1. A compound woven fabric *antifriction bearing element* having threads of two different materials, the material of one thread having the properties of being bondable to a material *of a bearing member* for the purpose of retaining and positioning the other thread, the material of which *other thread is tetrafluoroethylene resin which* has low friction characteristics but which is not readily bondable to [other materials] *the material of the member,* the threads being so interwoven as to have those of [low friction characteristics] *tetrafluoroethylene resin* disposed substantially on one face of the fabric *to form the low friction bearing engaging surface for the member* and the threads having the bonding characteristics disposed on the opposite face thereof whereby the bonding threads may be secured in position in a manner which does not substantially affect the low friction properties of the *tetrafluoroethylene resin* [other] threads which are securely anchored in place by the intertwining portions of the bondable threads after the latter are secured in position *to have the tetrafluoroethylene resin threads form the bearing surface.*

[2. A compound woven fabric for low friction surfaces and the like, threads of low friction resin material to which resins will not satisfactorily bond woven as a face material, and threads to which resins will bond woven into the threads of the face material on the opposite side from the usable face of said material so that when bonded the bonding of said second threads physically anchors said first threads at spaced points throughout the material.]

[3. A compound woven fabric for low friction surfaces and the like woven from threads of low friction resin material to which other resins will not bond, and threads woven on one side of said woven fabric to which resin material will bond in position to be secured together or to a member to have such secured threads securely anchor the woven fabric by means of the interwoven relation therewith.]

[4. In a compound woven fabric for a low friction surface and the like, threads of low friction material to which resins will not satisfactorily bond, and backing threads to which a resin will bond, said threads being woven into a cloth having sufficient threads of low friction material on one face to provide a surface of desired low friction properties with sufficient backing threads on the opposite face to provide a support for said low friction threads whereby said backing threads physically anchor said low friction threads at spaced points throughout the material against any substantial movement when said backing threads are secured against any substantial movement.]

*5. A bearing comprising a backing member having a fabric material secured thereto to provide the working face thereof, said fabric material comprising a compound woven fabric having threads of two different materials, the material of one thread having the properties of being bondable to the backing member, the material of the other thread being a polymeric fluorocarbon resin, the threads being so interwoven as to have those of the polymeric fluorocarbon resin disposed substantially on one face of the fabric and the threads having the bondable characteristics disposed on the opposite face thereof, said bondable threads being bonded to the backing member to securely anchor the threads of the polymeric fluorocarbon resin in place as the low friction working face of the bearing.*

*6. A bearing comprising a backing member having a fabric material secured thereto to provide the working face thereof, said fabric material comprising a compound woven fabric having threads of two different materials, the material of one thread having the properties of being bondable to the backing member, the material of the other thread being a low friction material that will not readily bond to said bearing member, the threads being so interwoven as to have those of the low friction material disposed substantially on one face of the fabric and the threads having the bondable characteristics disposed on the opposite face thereof, said bondable threads being bonded to the backing member to securely anchor the threads of the low friction material in place as the low friction working face of the bearing.*

*7. A bearing comprising a backing member having a fabric material secured thereto to provide the working face thereof, said fabric material comprising a compound woven fabric having threads of two different materials, the material of one thread having the properties of being a low friction material having a coefficient of friction against polished steel in the absence of conventional lubricants of approximately 0.02 to 0.15, the material of the other thread being bondable to the backing member, the threads being so interwoven as to have those of the low friction material disposed substantially on one face of the fabric and the threads having the bondable character-*

*istics disposed on the opposite face thereof, said bondable threads being bonded to the backing member to securely anchor the threads of the low friction material in place as the low friction working face of the bearing.*

*8. A bearing comprising a backing member having a fabric material secured thereto to provide the working face thereof, said fabric material comprising a compound fabric having fibers of two different materials, the material of one fiber having the properties of being bondable to the backing member, the material of the other fiber being a polymeric fluorocarbon resin, the fibers being so intermingled as to have those of the polymeric fluorocarbon resin disposed substantially on one face of the fabric and those having the bondable characteristics disposed on the opposite face thereof, said bondable fibers being bonded to the backing member to securely anchor the fibers of the polymeric fluorocarbon resin in place as the low friction working face of the bearing.*

*9. A compound woven fabric antifriction bearing element having threads of two different materials, the material of one thread having the properties of being bondable to a material of a bearing member for the purpose of retaining and positioning the other thread, the material of which other thread is a polymeric fluorocarbon resin which has low friction characteristics but which is not readily bondable to the material of the member, the threads being so interwoven as to have those of polymeric fluorocarbon disposed substantially on one face of the fabric to form the low friction bearing engaging surface for the member and the threads having the bonding characteristics disposed on the opposite face thereof whereby the bonding threads may be secured in position in a manner which does not substantially affect the low friction properties of the polymeric fluorocarbon resin threads which are securely anchored in place by the intertwining portions of the bondable threads after the latter are secured in position to have the polymeric fluorocarbon resin threads form the bearing surface.*

*10. A compound woven fabric antifriction bearing element having threads of two different materials, the material of one thread having the properties of being bondable to a material of a bearing member for the purpose of retaining and positioning the other thread, the material of which other thread is a low friction material not readily bondable to the material of the member and having a coefficient of friction against polished steel in the absence of conventional lubricants of approximately 0.02 to 0.15, the threads being so interwoven as to have those of low friction characteristics disposed substantially on one face of the fabric to form the low friction bearing engaging surface for the member and the threads having the bonding characteristics disposed on the opposite face thereof whereby the bonding threads may be secured in position in a manner which does not substantially affect the low friction properties of the other threads which are securely anchored in place by the intertwining portions of the bondable threads after the latter are secured in position to have the low friction threads form the bearing surface.*

References Cited in the file of this patent or the original patent

UNITED STATES PATENTS

| | | |
|---|---|---|
| 1,983,617 | Ladon | Dec. 11, 1934 |
| 2,130,359 | Miller | Sept. 20, 1938 |
| 2,208,090 | Whittier | July 16, 1940 |
| 2,312,089 | Gobeille | Feb. 23, 1943 |
| 2,461,626 | Booth | Feb. 15, 1949 |
| 2,540,874 | Geddings | Feb. 5, 1951 |
| 2,542,297 | Sunbury et al. | Feb. 20, 1951 |
| 2,551,175 | Smith | May 1, 1951 |
| 2,685,707 | Llewellyn et al. | Aug. 10, 1954 |
| 2,691,814 | Tait | Oct. 19, 1954 |
| 2,711,828 | Webb et al. | June 28, 1955 |
| 2,718,452 | Lontz | Sept. 20, 1955 |
| 2,723,932 | Ross et al. | Nov. 15, 1955 |
| 2,835,521 | White | May 20, 1958 |